(No Model.) 2 Sheets—Sheet 2.
W. T. LEECH & G. HIMELSPARK.
FLEECE DIVIDING ATTACHMENT FOR CARDING ENGINES.
No. 439,073. Patented Oct. 21, 1890.
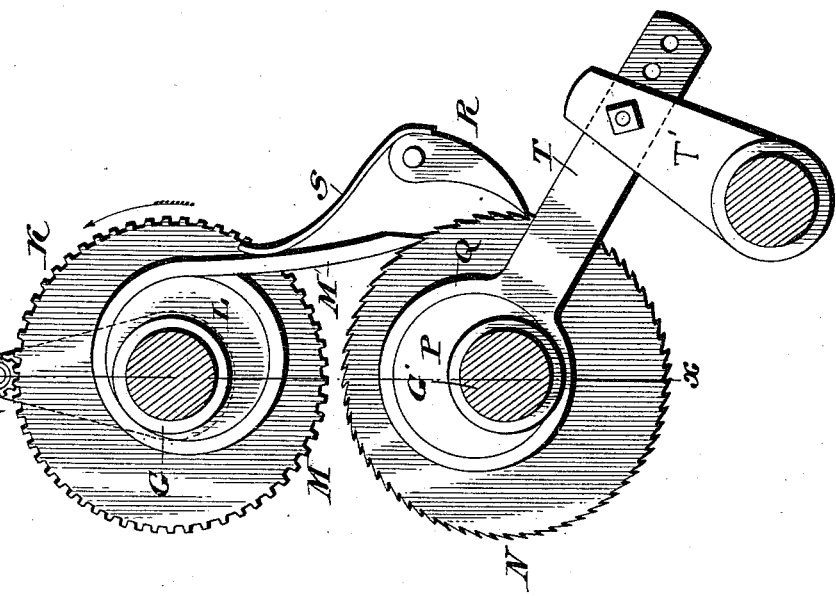
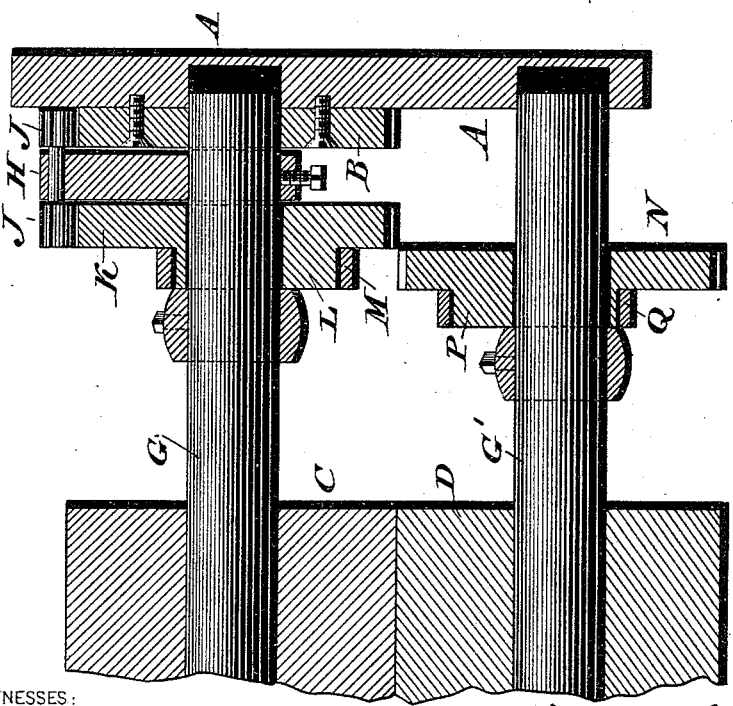

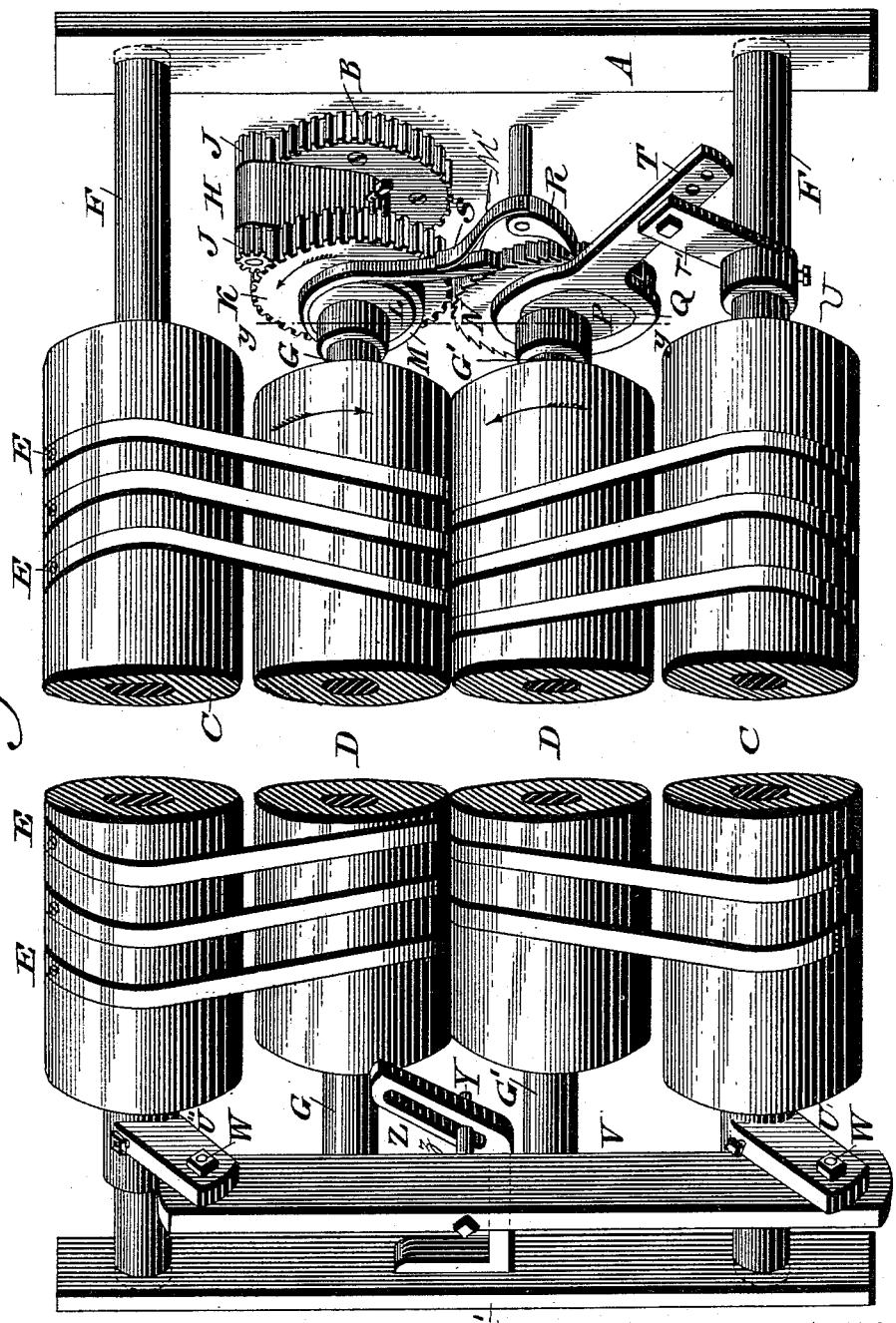

UNITED STATES PATENT OFFICE.

WILLIAM T. LEECH AND GEORGE HIMELSPARK, OF PHILADELPHIA, PENNSYLVANIA, ASSIGNORS OF ONE-HALF TO JEROME CARTY, TRUSTEE, OF SAME PLACE.

FLEECE-DIVIDING ATTACHMENT FOR CARDING-ENGINES.

SPECIFICATION forming part of Letters Patent No. 439,073, dated October 21, 1890.

Application filed March 9, 1889. Serial No. 302,631. (No model.)

*To all whom it may concern:*

Be it known that we, WILLIAM T. LEECH and GEORGE HIMELSPARK, citizens of the United States, residing in the city and county of Philadelphia, State of Pennsylvania, have invented a new and useful Improvement in Fleece-Dividing Attachments for Carding-Engines, which improvement is fully set forth in the following specification and accompanying drawings.

Our invention consists of improvements in the fleece-dividing attachment of a carding-engine, whereby the blades thereof may be shifted, and thus prevented from cutting or grooving certain rollers with which they are in contact.

Figure 1 represents a perspective view of portion of a condenser of a carding-engine embodying our invention, the right and left parts of said portion being in different perspective and the rollers broken. Fig. 2 represents a section, partly in elevation on line *x x*, Fig. 3, the latter being a section on line *y y*, Fig. 1, the parts shown in Figs. 2 and 3 being on an enlarged scale.

Similar letters of reference indicate corresponding parts in the several figures.

Referring to the drawings, A A' designates the uprights of the frame of the fleece-dividing attachment of a carding-engine, and B designates a gear-wheel, which is secured to the upright A.

C and D designate the rollers of the fleece-dividing attachment, and E the blades thereof, which parts, broadly considered, are well known.

F F' designate the shafts of the rollers C, the same being mounted in the upright A A', the openings in the latter being sufficiently deep to allow said shafts to have a slight longitudinal play therein.

G G' designate the shafts of the rollers D D, the same being properly mounted in the uprights A A', the shaft G passing freely through the stationary gear-wheel B.

Secured to the shaft G adjacent to the wheel B is a traveler H, consisting of an arm on whose outer end is mounted a shaft which carries on its ends the pinions J J', the latter meshing with the gear-wheel B and with a gear-wheel K, which is mounted on the shaft G and carries an eccentric L.

M designates a strap, which encircles the eccentric L, and is provided with a pawl M', engaging with which is a ratchet-wheel N, which freely encircles the shaft G' and carries an eccentric P, which is encircled by a strap Q.

R designates a check-pawl, which is mounted on the upright A and engages with the ratchet-wheel N for preventing the return motion of the latter, said pawl being pressed against the ratchet-wheel by the spring S, which is secured to said pawl, and also bears against the pawl M'.

The strap Q has formed or connected with it an arm T, pivoted to an arm T', the arm T' being connected by a collar U and set-screw to the shaft F'.

To the shaft F' opposite to the lever T is secured a crank-arm U', and to the shaft F above said arm U' is secured a crank-arm U'', the two arms being connected by a beam V, pivoted to said arms U' U'' by means of bolts W, said beam being adapted to rise and fall and being capable of lateral motions. The beam carries a pin Y, which plays in a guide Z, the latter having an obliquely-arranged slot *z* to receive said pin.

The operation is as follows: As the rollers D revolve, the shaft G rotates the carrier H, whereby, owing to the gear-wheel B, the pinions J J' are also rotated. In order that the rotation of pinion J may impart rotation to wheel K, the pitch of said wheel K must differ from that of wheel B, and the pinion J must differ accordingly from pinion J'. In practice the pitch of wheel K will be made greater than that of wheel B, in order that a relatively slow motion may be imparted to the wheel K. It will be understood that the wheel K will lose motion on account of the forward movement of the axis of pinion J. The eccentric L rotates with wheel K and actuates the strap and pawl M to turn ratchet-wheel N. The latter in turn rotates the eccentric P, whereby the arms T T' are moved and oscillation is gradually imparted to the shaft F'. Owing to the arm U', which is connected with said shaft and the beam V, the latter is raised, and as its pin Y moves in the oblique or diagonal slot of the guide Z slight longitudinal motion is imparted to said beam, and consequently to the arms U U'. As the shafts F F' are connected with said arms, as has been stated, said shafts also receive longitudinal motion, and the rollers C C are carried with the same. The blades E, which are connected at one end with the rollers C, move with said rollers in the direction of the same, and thus shift the portions of the blades that are in contact with the rollers D or cause said portions to creep laterally, whereby they gradually come in contact with new or fresh surfaces of said rollers D, and the latter are prevented from being cut or grooved by the blades, which would be the case if the said blades preserved the same positions on said rollers. As the gearing and connected parts continue their operation, the beam V makes its return motion or falls and the shafts F F' are moved longitudinally in the opposite direction to that first accomplished, and thus the blades are again shifted on the rollers D, it being evident that the operations are preferably slow and gradual and that slight motions of the shafts F F' are capable of shifting the blades on the rollers D to an appreciable extent.

Having thus described our invention, what we claim as new, and desire to secure by Letters Patent, is—

1. A fleece-dividing attachment for carding-engines, consisting of uprights with upper and lower shafts journaled loosely therein, so as to be capable of longitudinal play, intermediate shafts journaled in said uprights, a roller on each of said shafts, the blades connected each at one end to a roller on an upper or a lower shaft, the fixed gear, the carrier having the pinions, the loosely-mounted gear having the eccentric, the strap provided with a pawl, the loosely-mounted ratchet-wheel, also having an eccentric, connections between the second eccentric and the lower shaft to oscillate the same, connections between the lower shaft and the upper shaft, and a device to cause the said upper and lower shafts to move longitudinally when oscillated, as described.

2. A gear-wheel having an eccentric thereon and devices therefor, a strap having a pawl on said eccentric, in combination with a ratchet-wheel, with which said pawl engages, an eccentric on said ratchet-wheel, a strap and an arm fitted on the eccentric of the ratchet-wheel, a shaft to which said arm is connected, and the rollers and blades of the fleece-dividing attachment, and means connected with said shaft whereby said rollers receive longitudinal motions and said blades are accordingly shifted, substantially as described.

3. The rollers and blades of a fleece-dividing attachment, in combination with crank-arms connected with the shafts of the rollers to which said blades are affixed, vibrating means for said shafts, a beam jointed to said arms, and means for imparting longitudinal motions to said beam, whereby the rollers to which the blades are affixed receive longitudinal motions and the blades are thereby shifted, substantially as described.

4. The rollers and blades of a fleece-dividing attachment, in combination with a rising and falling beam which is connected with the shafts of the rollers to which the blades are attached, means to oscillate one of said shafts, and a guide secured to the frame for imparting lateral motions to said rising and falling beam, substantially as and for the purpose set forth.

5. The rollers and blades of a fleece-dividing attachment, in combination with crank-arms attached to the shafts of the rollers to which the blades are affixed, means for oscillating one of said shafts, a beam jointed to said arms, a pin projecting from said beam, and an oblique guide connected with the frame to receive said pin, substantially as described.

6. The combination of uprights, one of which has the gear-wheel B secured thereto, with the shafts F F' G G', (the shafts F F' having longitudinal play in the said uprights,) the carrier H, having the rotary pinions J J', gear-wheel K, mounted on the shaft G and having eccentric L, the strap M, with pawl M', the ratchet-wheel N, with eccentric P, the strap Q, with arm T, and the collar U on the shaft F', with arm connected with arm T, and the beam V, jointed to crank-arms connected with the shafts F and F' and having the pin Y moving in the guide Z, substantially as described.

WILLIAM T. LEECH.
GEORGE HIMELSPARK.

Witnesses:
JOHN A. WIEDERSHEIM,
A. P. JENNINGS.